United States Patent
Mansfield et al.

(10) Patent No.: US 6,914,881 B1
(45) Date of Patent: Jul. 5, 2005

(54) PRIORITIZED CONTINUOUS-DEFICIT ROUND ROBIN SCHEDULING

(75) Inventors: Todd H. Mansfield, Arlington, MA (US); Jeffrey L. Cooper, Gardner, MA (US)

(73) Assignee: Nortel Networks Ltd (CA)

( * ) Notice: Subject to any disclaimer, the term of this patent is extended or adjusted under 35 U.S.C. 154(b) by 799 days.

(21) Appl. No.: 09/724,488

(22) Filed: Nov. 28, 2000

(51) Int. Cl.$^7$ .............................. H04L 12/26; H04J 3/14; G06F 11/00; G08C 15/00; G01R 31/08

(52) U.S. Cl. ...................... 370/230; 370/252; 370/395; 370/429; 709/232

(58) Field of Search ................................ 370/230–236, 370/250–252, 360–395, 412–429, 229; 709/226–235

(56) References Cited

U.S. PATENT DOCUMENTS

| | | | | |
|---|---|---|---|---|
| 5,905,730 A | * | 5/1999 | Yang et al. | 370/429 |
| 5,956,340 A | * | 9/1999 | Afek et al. | 370/412 |
| 5,991,812 A | * | 11/1999 | Srinivasan | 709/232 |
| 6,101,193 A | * | 8/2000 | Ohba | 370/429 |
| 6,470,016 B1 | * | 10/2002 | Kalkunte et al. | 370/395.41 |
| 6,490,248 B1 | * | 12/2002 | Shimojo | 370/229 |
| 6,526,060 B1 | * | 2/2003 | Hughes et al. | 370/395.4 |
| 6,567,417 B2 | * | 5/2003 | Kalkunte et al. | 370/428 |
| 6,683,884 B1 | * | 1/2004 | Howard | 370/412 |
| 6,687,247 B1 | * | 2/2004 | Wilford et al. | 370/392 |
| 6,714,517 B1 | * | 3/2004 | Fawaz et al. | 370/236 |

OTHER PUBLICATIONS

U.S. Appl. No. 09/248,155, filed Feb. 9, 1999, Kalkunte et al.

"Efficient Fair Queuing Using Deficit Round Robin", Shreedhar, et al., Oct. 16, 1995.

* cited by examiner

Primary Examiner—Man U. Phan
(74) Attorney, Agent, or Firm—Steubing McGuinness & Manaras LLP

(57) ABSTRACT

A method and apparatus for queue selection is described below as Prioritized Continuous-Deficit Round Robin (PC-DRR) Scheduling. In PC-DRR scheduling a queue is selected as a source for the shared datapath using a modified round-robin approach, where queues are cyclically, sequentially evaluated to determine whether or not there is data stored in the queue. In PC-DRR scheduling, each queue is assigned a weight, wherein the weight corresponds to a predefined bandwidth that is allocated to the queue. Thus, the weight defines a fixed allotment of transmit opportunities that are to be allowed for the associated queue during its transmit tenure. In a preferred embodiment, a minimum permissible weight that is assigned to a queue is equal to a Maximum Packet Size. As data are drained from the queue, the weight is decreased incrementally by the amount of data sent, providing a balance. Thus the balance represents the instantaneous count of the number of output transmits that are remain for the queue within its transmit tenure. The queue continues to drain until the quantity of data transmitted is greater than the remaining balance, at which point the balance associated with the queue will become negative or zero. Once one queue is drained, or has exceeded its balance, the next sequential queue that has data to transmit is selected, where its associated weight will correspond to the number of fined transmit opportunities that are permitted for the queue.

9 Claims, 5 Drawing Sheets

Figure 5

| | | | |
|---|---|---|---|
| Weight | 70 | 20 | 5 |
| Initial Balance | 0 | 0 | 0 |
| | Q1: 30x, 30x, 45x | Q2: 20x, 20x | Q3: 4x, 11x, 5x, 6x |

| | Q1 | Q2 | Q3 |
|---|---|---|---|
| 1st iteration | Balance = 70<br>45x<br>30x<br>Balance = -5 | Balance = 20<br>20x<br>Balance = 0 | Balance = 5<br>6x<br>Balance = -1 |
| 2nd iteration | Balance = 65<br>30x<br>Balance = 0 | Balance = 20<br>20x<br>Balance = 0 | Balance = 4<br>5x<br>Balance = -1 |
| 3rd iteration | Balance = 0 | Balance = 0 | Balance = 4<br>11x<br>Balance = -7 |
| 4rd iteration | Balance = 0 | Balance = 0 | Balance = -2 |

PRIORITIZED CONTINUOUS-DEFICIT ROUND ROBIN SCHEDULING

FIELD OF THE INVENTION

This invention relates generally to the field of networking and more specifically to a method and apparatus for managing packets within a network.

BACKGROUND

In the area of computer design, queues are often used as temporary storage for data. When a number of source devices share a common datapath, a queue may be provided for each source to provide temporary storage of data for the source as it seeks access to the datapath. Each of the different sources may transmit data of different types, sizes or priority. For example, queues are often used in network design when packets of different types, sizes and priorities are forwarded from a number of different source nodes to a shared output port or datapath of a network.

Selection mechanisms are often used to identify which of the number of sources is to have access to the shared datapath. One example of a typical selection mechanism is a round-robin type of selection mechanism, known to those of skill in the art, wherein sources are selected for data transmission in a sequential, cyclical manner. However, round-robin selection does not always provide fair access to the shared datapath for each source. This is because one source may typically generate larger size data than its neighboring source. In a round-robin scheduling scheme, such a source would utilize a larger percentage of the datapath bandwidth, thus not permitting fair access to the datapath by each of the sources.

For example, in a network entire packets must be transmitted in whole and uninterrupted. Flow scheduling schemes that forward packets without sensitivity to packet size may give unfairly large shares of output port bandwidth to flows containing mostly larger sized packets. Thus, queues with larger packets tend to dominate the bandwidth when pained against queues with smaller packets. One queue selection method attempts to address this issue by identifying the packet sizes of each of the enqueued packets, and selecting the next packet for forwarding based on the size of the packet and the relative priorities of each of the queues. One problem with such an approach, however, is that it requires time to extract the size data from the packet in order to perform the calculation, thereby increasing the time that each of the packets remains at the shared resource and thereby reducing the overall performance of the resource. It would be desirable to determine a method of queue selection that would provide fair access to a shared datapath while minimizing loss in data transfers and maximizing resource performance.

SUMMARY

A method and apparatus for queue selection is described below as Prioritized Continuous-Deficit Round Robin (PC-DRR) Scheduling. In PC-DRR scheduling, a queue is selected as a source for the shared datapath using a modified round-robin approach, where queues are cyclically, sequentially evaluated to determine whether or not there is data stored in the queue. In one embodiment of PC-DRR scheduling, each queue is assigned a weight, wherein the weight corresponds to a predefined bandwidth that is allocated to the queue. Thus, the weight defines a fixed allotment of transmit opportunities that are to be allowed for the associated queue during its transmit tenure. In a preferred embodiment, a minimum permissible weight that is assigned to a queue is equal to a Maximum Packet Size. As data are drained from the queue, the weight is decreased incrementally by the amount of data scat, providing a balance. Thus the balance represents the instantaneous count of the number of output transmits that are remain for the queue within its transmit tenure. The queue continues to drain until the quantity of data transmitted is greater than or equal to the remaining balance, at which point the balance associated with the queue will become negative or zero. Once one queue has reached or exceeded its balance, the next sequential queue that has data to transmit is selected, where its associated weight will correspond to the number of fixed transmit opportunities that are permitted for the queue.

Using the PCD-RR scheduling approach, a queuing system is implemented wherein each queue manager needs only to retain a count of the balance and the predefined weight. Because transmit opportunities for each queue are controlled by varying the weight of each queue, fair access to the shared datapath can be tightly controlled. In addition, because the size of the packet is not used in the PCD-RR approach, no packet header processing needs to be performed to extract the size of the packet. Because no packet header processing needs to be performed, the overall latency of the forwarding path as well as the complexity of the interface is reduced.

DESCRIPTION OF ILLUSTRATIVE DRAWINGS

FIG. 5 is a diagram illustrating exemplary contents of three queues that are dequeued using the PC-DRR method of the present invention.

DESCRIPTION

Figure 1:
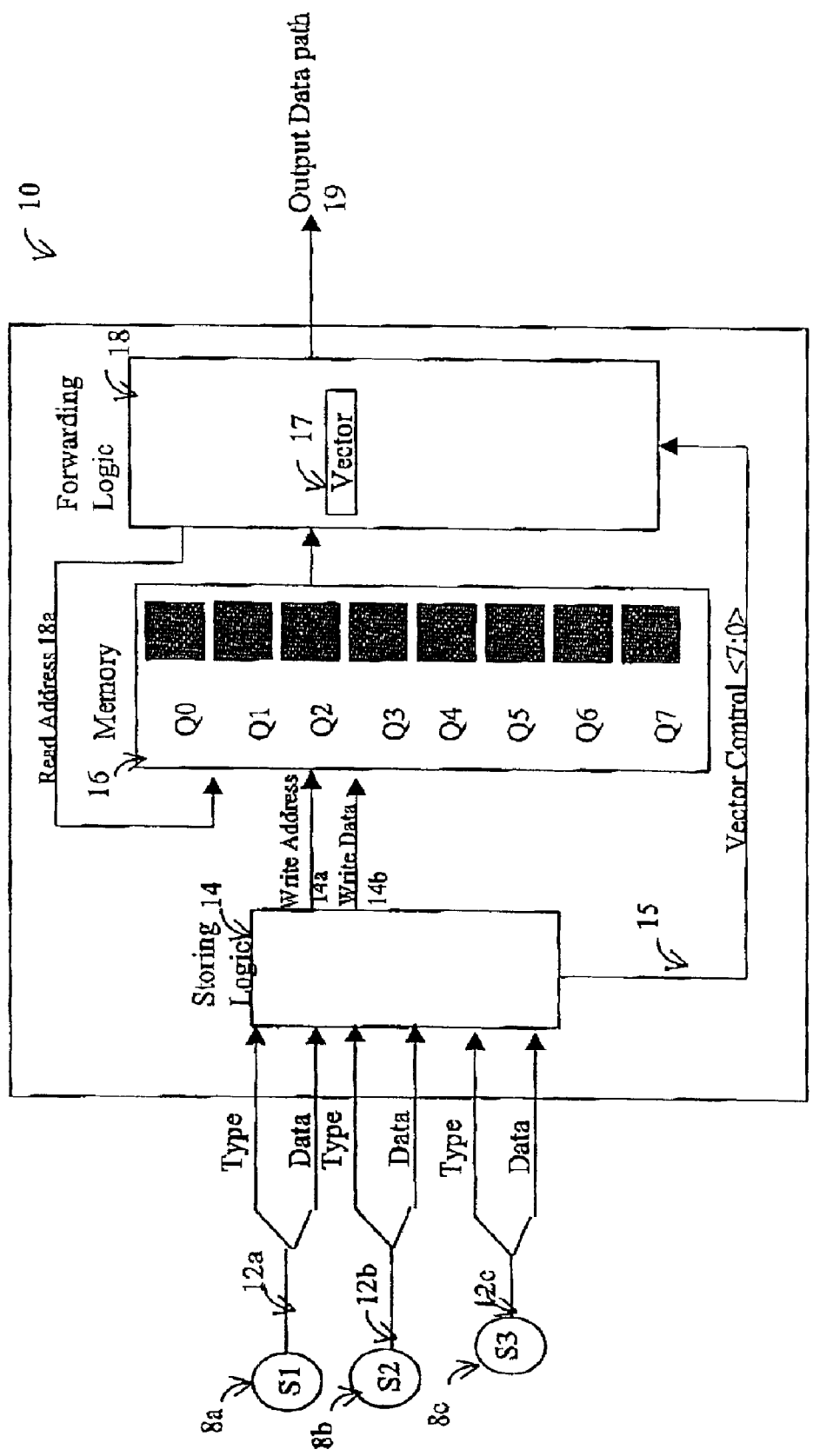
FIG. 1 is a block diagram of one embodiment of an egress data path, arranged according to the present invention, which may be included as part of a network resource, the egress datapath including storing logic, memory and forwarding logic.

In FIG. 1 an exemplary block diagram of one embodiment of queue logic 10 according to the present invention is provided. The queue logic 10 couples input data paths 12a–12c (connected to sources 8a–8c, respectively) to a shared output data path 19. Each of the source devices 8a–8c may forward data of different types, where associated with each of the data types may be a priority. The queue logic 10 uses a prioritized Continuous Deficit Round-Robin (PCD-RR) scheduling technique to ensure that each of the sources 8a–8c obtains fair access to the output data path. The PCD-RR scheduling technique of the present invention may be used in any environment that seeks to allow fair access by a number of source devices to a shared resource. For example, one environment in which the PCD-RR scheduling technique would be particularly useful would be in a switch or router of a network, where a number of source nodes share a common output data port.

Queue logic 10 includes storing logic 14 for receiving data from the sources 8a–8c. Storing logic 14 is coupled to a memory 16, and controls the writing of packets of data into queues of the memory 16. In FIG. 1, the memory is shown to include eight (8) queues, Q0–Q7. The queues may be allocated such that they store data of a certain priority, data of a certain type, data from a particular source, or some combination thereof. Although each queue is shown visually to be the same size, that is not a limitation of the present invention, and it may in fact occur that the queues Q0–Q7 each vary in size. The numbers, sizes and priorities of each of the queues, are either fixed or programmable, and in one embodiment may be modified during operation in response to the characteristics of the packet flows through the network.

Forwarding logic 18 is coupled to memory 16, and controls the reading of data from the memory 16, which is forwarded to output data path 19. In one embodiment of the invention, queues in memory are selected as sources for transfer of data to the output data paths in such a manner that fairly allocates the output data path resource to each of the sources that issue the data.

As shown in FIG. 1, according to one embodiment of the invention, storing logic 14 is coupled to forwarding logic 18 by a signal Vector Control 15. Vector Control 15 is an eight bit vector, which controls the assertion and deassertion of bits in a Vector 17 in the forwarding logic 18. As will be described in more detail later herein, the Vector 17 is used to select one of the queues in memory 16 as a source for data flow. The entire interface between the storing logic 14 and the forwarding logic 18 is only the Vector Control signal 15. With such an arrangement and because the size of the data that is stored in the queue need not be calculated by the forwarding logic, parsing of the data need not occur prior to transmission. As a result, the overall latency for transmitting a packet, as well as the complexity of the interface is reduced.

The PCD-RR scheduling mechanism will now be described in more detail with regard to FIGS. 2–5. In this description, by way of example, the scheduling mechanism will be described in a networked environment, where the data stored in the respective queues is packet data, the sources are nodes coupled together by a network fabric. The scheduling mechanism may be used in a network router, switch or other device, where the shared output data path connects the multiple sources to a common output data port, although the present invention is not limited to this specific implementation.

In the description, the following terms will be used: Quanta, Weight and Balance. These terms have the following definitions. The Quanta (Q) is a constant, indicating a number of bytes that is selected as a base. The number selected as the Quanta (Q) may be the number of bytes that are transmitted per transmit period, or may be equivalent to the minimum size packet for a given protocol. For example, in one exemplary embodiment using an Ethernet protocol, wherein the minimum packet size is 64 bytes, Q=64. The Weight is the predefined bandwidth that is allocated to the queue and is represented as the number of fixed transmit opportunities that are given to a specific queue in terms of Q. For example, using the Ethernet example above where Q is equal to 64, to allocate a transmit bandwidth of 1536 bytes to a given queue, a weight of 1536/64 or 24 should be assigned to the queue. Thus, in an embodiment where 64 bytes are transmitted per transmit cycle, there would be 24 transmit cycles allocated to the queue each time that queue is selected to provide data.

In one embodiment, the minimum value for the Weight is equal to the maximum packet size of the packet protocol. Having the minimum value for the Weight equal to the maximum packet size ensures that a queue will always be able to transmit a full packet when it scheduled to transmit.

Figure 2:
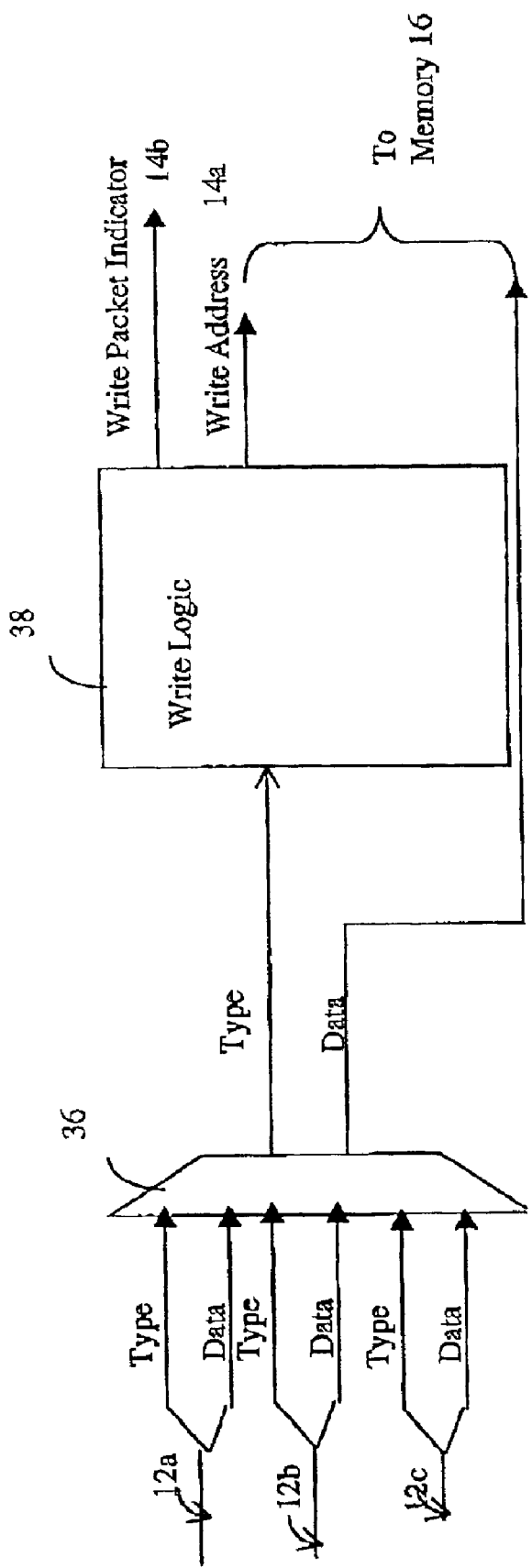
FIG. 2 is a block diagram of an illustrative embodiment of the storing logic of FIG. 1.
Figure 2:
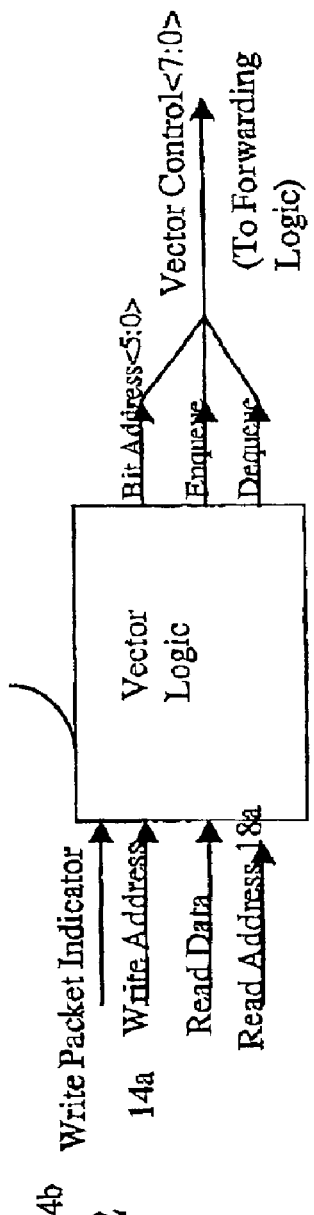

Referring now to FIG. 2, a block diagram of the storing logic is shown in more detail. When a packet is received at the storing logic, the packet includes a descriptor header that is appended to the packet during transmit through a higher level interconnect, with the header including information such as the source address of the node issuing the packet, and the destination address of the node receiving the packet. Using logic known to those of skill in the art, a type or priority of the data is determined, whether by association with the source address or by decoding other values in the packet header. The type or priority information and data is forwarded from each of the sources to selector 36. The selector 36 selects data from one the source currently transmitting, and forwards the Type indicator to the write logic 38.

In one exemplary embodiment, data is stored in the queues according to its Type. The Type could indicate that it is associated with a certain source, or that it is data having a certain priority, or a combination of the two. In the embodiment shown in FIG. 1, there are eight queues, each of which is allocated to store a certain Type of data. Write logic 38 controls the storage of packet data into the appropriate queue of the memory 16 according to the Type value. The write logic 38 provides, as output, a write address 14a to memory 16. This write address 14a is also forwarded to vector logic 39. The write logic 38a also provides as output a Ware Packet Indicator 14b to Vector logic 39, which indicates to the Vector logic that the write of a packet into the queue has completed.

Figure 3:
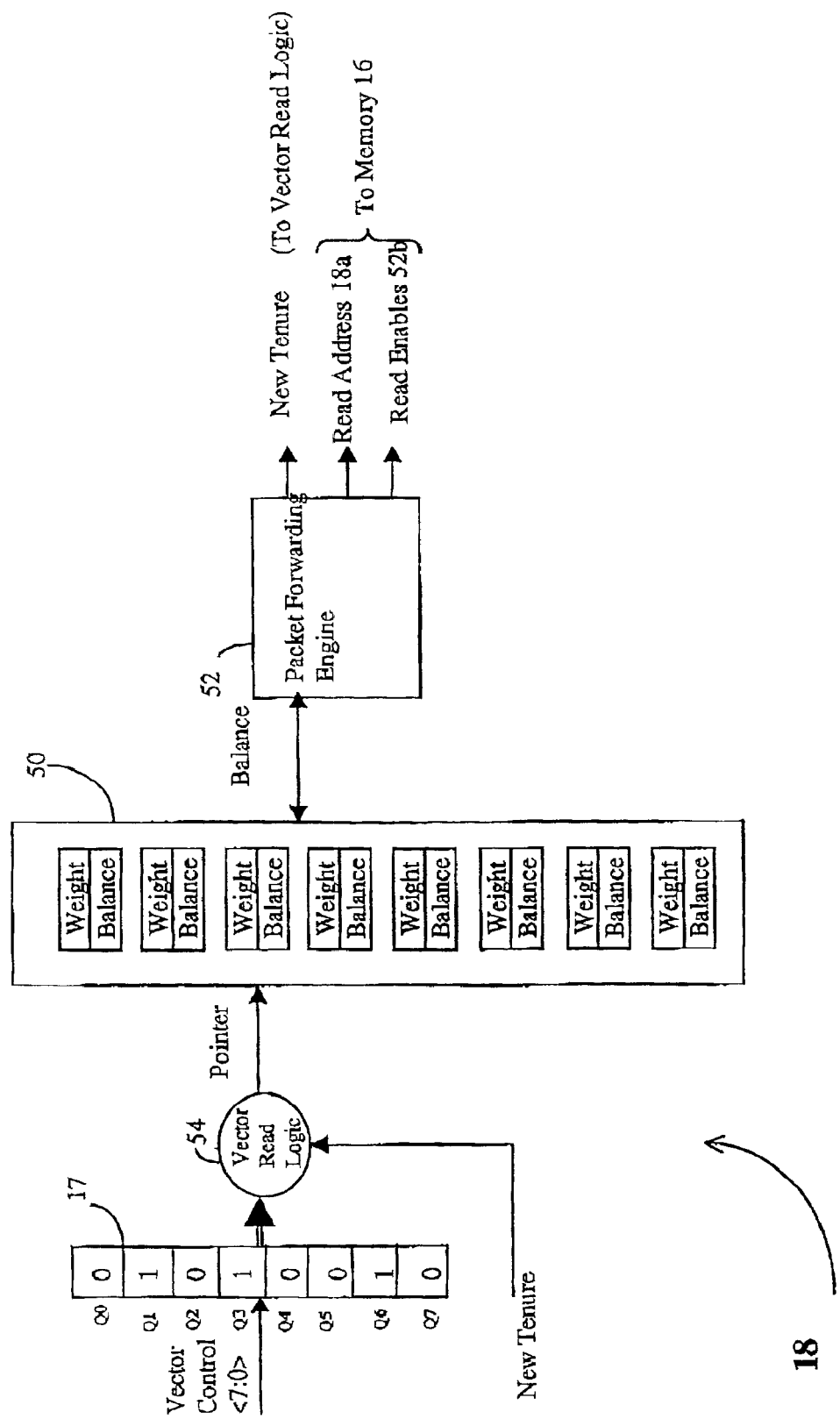
FIG. 3 is block diagram of an illustrative embodiment of the forwarding logic of FIG. 1.

Vector logic 39 controls the update of the vector 17 in the forwarding logic, which is shown in greater detail in FIG. 3. The vector 17 includes a number of bits corresponding to the number of queues of memory 16. In the example of FIG. 3, the vector includes 8 bits, one bit for each of the eight queues (Q0–Q7). A bit is set for each queue that stores at least one packet of data. Thus, in the example shown in FIG. 3, queues Q1, Q3 and Q6 store at least one packet of data. As will be described in more detail later herein, the forwarding logic uses this vector to determine from which queue to pull the next packet for forwarding. It should be noted that, although a vector is described below, any other method of indicating the presence of data within the queue may alternatively be used, and the present invention is not limited to any particular indication implementation.

The storing logic selects the queue to store the incoming packet data and communicates the information about which queue is being used to the forwarding logic 18 via the vector Control signal 15. The Vector Control signal 15 includes 3 fields of information; the bit address <4:0> of the vector to be updated, an enqueue signal indicating that the associated queue, which was empty, is about to become non-empty (i.e., is being used to store out or more packets), and a dequeue signal, indicating that the associated queue is about to become empty. The enqueue and dequeue signals are controlled in response to the write address, received from the storing logic 14, and read addresses, received from the forwarding logic 18, as described below.

In one embodiment, the queues are arranged as first-in, first-out (FIFO) queues, and the vector logic 39 maintains, for each of the queues, the write address of the most recent data written to the queue and an "empty" bit. When a data packet is first received into the queue, the empty bit is cleared (to indicate a non-empty state, and the write address of the data packet is stored. Thus, this write address indicates the "last entry" of the queue. During this transaction, the enqueue bits would be asserted to indicate that the queue, formerly empty, is now storing data. The storing logic would transmit the bit address of the queue storing the data and the enqueue bits over to the forwarding logic, and the vector control logic would assert the appropriate bit within the vector, thereby indicating to the remainder of the forwarding logic that there is data in that queue.

As more packets are received into the queue, the address of the last data packet written to the queue is updated to track the "last entry" in the queue. During a read operation, because the queue is a FIFO queue, the oldest data in the queue is transmitted first. If the queue is to be fully drained (which is not always the case in PCD-RR scheduling as will be seen below) the reads will continue until the read address of the queue matches the "last entry" address of the queue. This match indicates to the vector control logic 39 that the queue is about to become empty. The vector logic then forwards the bit address of the associated queue, asserts the dequeue signal to the forwarding logic, and sets the "empty" bit associated with the queue.

Thus, the vector control logic 39 controls the setting and clearing of the bits of the vector 17, which in turn control the operation of the forwarding logic 18. As shown in FIG. 3, the forwarding logic includes vector read logic 54, which reads the bits of the vector 17 to identify the next queue within memory for extracting packet data. In one embodiment, the vector is parsed in a round robin sequence, that is, the vector read logic sequentially examines the status (set or clear) of each of the bits of the vector 17. The sequence may be from most significant bit to least significant bit, or visa versa, and when the logic 54 reaches the end of the sequence, it starts again at the beginning. Each examination of the vector bit and possible read of the associated queue is considered the queue's Tenure. If, upon examination of a bit, the bit's status is set to indicate that there is packet data in the associated queue, then the vector read logic 54 provides a pointer to a weight/balance array 50.

The weight/balance array 50 includes a Weight and Balance entry 60 for each one of the queues Q0–Q7. As described above, the Weight value 60a is a number of transmit cycles that are allocated to the respective queue during its Tenure, and therefore indicates a relative priority for transmission of the packets within the queue as compared to packets within the other queues. For example, given a two queue system, where it is desired to allocate 99% of the bandwidth to Queue A, and 1% of the bandwidth to Queue B, the Weight assigned to Queue A would be 99, while the Weight assigned to Queue B would be 1. As mentioned above, the Weight is calculated by dividing a desired bandwidth by a selected Quanta, where the Quanta may correspond to a minimum packet size for a protocol, a number of bytes transmitted in a given transmit cycle, or some other value. The Balance value 60b is an instantaneous representation of the number of transmit cycles that are allocated to the queue. Each transmit cycle, the Balance is decremented by the number of bytes transmit in that cycle/Quanta. (For example, if Q=64, and 64 bytes are transmitted per cycle, the Balance is decremented by 1). According to one aspect of the present invention, packets will be forwarded out of the queue until the Balance is less than or equal to zero. The Balance value is forwarded from the Weigh/Balance array 50 to a packet-forwarding engine. The packet forwarding engine generates read addresses to the memory 16 to select the next packet to be provided to the output data path 19 according to the Prioritized Continuous-Deficit Round Robin (PC-DRR) scheduling mechanism of the present invention.

PC-DRR scheduling operates generally as follows. A Weight is assigned to each queue by a user. The Weight is programmable, and can be modified during operation to vary the bandwidth allocated to each queue. During the round-robin analysis of the vector 17, if the a bit in the vector is set to indicate that the queue contains data, the Weight is added to the Balance, and the Tenure for the queue begins. At initialization, the Balance is zero. Packet flows are received from the associated queue, where the packet flows may include one or more packets. During each transmit cycle for the packet flow, the Balance is decremented as described above. Packets are always transmitted in their entirety. At the end of the transmission of the packet, the Balance is examined. If the Balance is greater than 0, and the bit in the vector 17 associated with the queue is still set (indicating that one or more packets are still stored in the queue), then the next packet is transmitted. The transmission of packets from the queue continues until either the Balance is less than or equal to zero, or the queue becomes empty. At this point, the Tenure for that queue is completed, and the queue associated with the next sequentially "set" bit in the vector is processed.

The above described scheduling mechanism provides a straightforward mechanism for ensuring fair allocation of network resources to the incoming packet data while also providing a mechanism for prioritizing bandwidth among data paths. The weights assigned to each queue are programmable, thereby easily facilitating changes in bandwidth balancing as the network topology changes.

A more thorough description of the process of PC-DRR is provided below with regard to FIG. 4, using queue values provided in FIG. 5. In the example of FIG. 5, three queues are shown. One queue is assigned a Weight of 70, the second is assigned a Weight of 20, and the third is assigned a Weight of 10. For simplicity of description, in the example of FIG. 7, x=1 Quanta.

Figure 4:
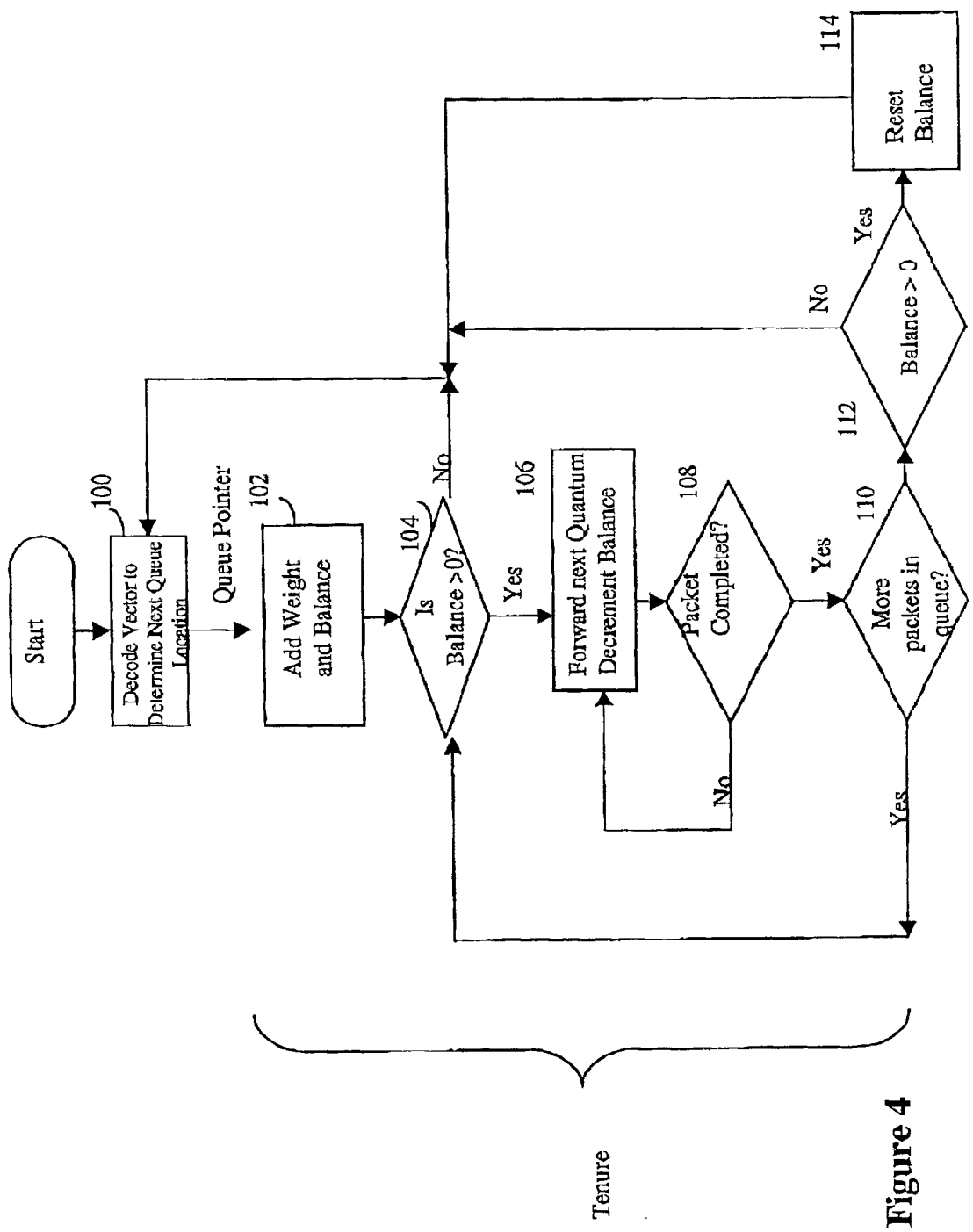
FIG. 4 is a flow diagram of illustrative steps of the PC-DRR scheduling method of the present invention.

At step 100, the Vector 17 is decoded as described with regard to FIG. 4 to identify the next queue Q0–Q7) to dequeue. As mentioned previously, the Vector 17 is parsed sequentially in a round-robin fashion. In the example of FIG. 7, assume that Q1 is selected. At step 102, when the queue bas been identified, the Weight is added to the Balance. The Balance is forwarded to the packet-forwarding engine 52. Given the example of FIG. 5, the Balance is 70.

At step 104, the packet forwarding engine 52 determines whether or not the Balance is greater than zero. If the Balance is equal to zero, and the process is at step 104 following step 102 then either the weight was set to zero or, in one possible implementation the negative balance was allowed to grow beyond the minimum weight. The process then returns to step 100 to decode the Vector 17 to identify the next queue.

If at step 104 the Balance is greater than zero, then there is packet data in the queue. The queues are arranged as FIFO's so, in the example of FIG. 5 the first packet to be forwarded includes 45 Quanta of data. At step 106, a first Quanta of the packet is forwarded out of the queue and the Balance is decremented by one Quanta. The process proceeds to step 108, where it is determined whether the entire packet has been promised. If the entire packet has not been forwarded, then the process returns to step 106 and steps 106 and 108 are continually executed until the entire packet is processed. Thus, at this point, in the example of FIG. 5 all 45 Quanta of the packet have been forwarded out to the network.

Once the forwarding of the packet is completed, at step 110 it is determined whether or not there are any more packets in the queue, as indicated by the Dequeue signal from the storing logic 14. If, at step 110 it was determined that there are no more packets in the queue, then, at step 112, the Balance is compared with zero. If there is a positive Balance associated with the queue, the Balance is reset to zero at step 114. The process then returns to step 100 to decode Vector 17 to identify the next queue for forwarding data.

If, however, at step 110 it is determined that there are more packets in the queue, at step 104 the Balance is compared with zero. In the example of FIG. 5, at this point the Balance is equal to (70–45), or 25. If the Balance is greater than zero, and there are more packets in the queue, the PC-DRR scheduling method dictates that the next packet should be processed. In the example of FIG. 5, this means that the next packet is processed using steps 104–110 as described above. After the 30 Quanta packet is processed, the Balance is equal to −5. If, at step 104, the Balance is negative, the number of Quanta forwarded to the network from that queue have equaled or exceeded the available Balance allocated to the queue. In this event, the processing of the queue is complete, and the process returns to step 100 to select the next queue.

Given the example of FIG. 5, and the steps described above, the processing of the queues would proceed as follows. Once Q1's Balance became negative, then a packet is output from Q2. Q2's initial Balance is twenty, so the 20 Quanta packet would use the allocated bandwidth for the queue's tenure, and processing would pass to Q3. Q3's weight is 5, so the 6 Quanta packet is forwarded from Q3, leaving a balance of −1.

During the second iteration through the queues, the Weight of 70 is added to the balance of −5 for Q1, leaving a Balance of 65. The 30 Quanta packet is forwarded out, leaving a Balance of 35 and an empty queue. The Balance for Q1 is then zeroed out, and Q2 is processed. Q2's Weight of 20 is added to the zero balance, the 20 Quanta packet is processed, leaving a Balance of zero. Q3 is then processed. The Weight of 5 is added to the current −1 Balance, leaving a balance of 4. The 5 Quanta, packet is processed at Q3, leaving a Balance of −1 and completing Q3's Tenure for the transmit round.

During the third iteration through the queues, Q1 and Q2 are empty. At Q3, the Weight of 5 is added to the Balance of −1, leaving a starting Balance of 4. The 11 Quanta packet is processed, leaving a Balance of −7. During the fourth iteration, Q1 and Q2 are still empty, and the weight of 5 gets added to Q3, leaving a −2 Balance. Because the weight for Q3 is still negative, no data is forwarded from the queue until the following iteration.

Thus it can be seen that the PC-DRR scheduling mechanism of the present invention provides a fair scheduling mechanism that provides programmable bandwidth allocation for each of the queues. Because in one embodiment the weights for each of the queues are programmable, as different applications and devices enter and leave the network bandwidth allocation can be optimized. In addition, because the packets need not be parsed to determine packet size, the complexity of the interface as well as the overall latency used to forward packets is reduced.

What we claim is:

1. A method for fairly scheduling access to a shared resource by a plurality of sources, the method comprising the steps of:

selecting a source from the plurality of sources to access the resource responsive to a predetermined order of addressing the plurality of sources, a type of data forwarded from the source and an allocation of the resource to the source, wherein data stored at each of the plurality of sources comprises one or more data items, and wherein the step of selecting further comprises:

a) examining indicators stored with each of the plurality of sources in the order to determine a next source having an indicator set to indicate presence of data at the source;

b) adding a weight indicating an allocation amount for an associated source to a shared resource and associated with the next source to a balance;

c) forwarding a data item from the next source to the shared resource until data items of the data have been forwarded;

d) for each data item that is forwarded from the next source to the shared resource, decrementing the balance;

e) responsive to the balance being greater than zero, and the indicator indicating the presence of data at the source, repeating steps c–d until the balance is less than or equal to zero.

2. The method as recited in claim 1, wherein the step of selecting is performed independent of a size of data stored at each of the plurality of sources.

3. The method according to claim 1, wherein each of the plurality of sources is associated with a predetermined type of data.

4. The method according to claim 3, where the type of the data indicates a priority of the data.

5. The method according to claim 1, wherein each of the sources is a queue.

6. An apparatus for fairly scheduling access to a shared resource by a plurality of sources, the apparatus comprising:

an indicator, for each of the sources, for indicating that the source seeks access to the resource;

a selection mechanism for selecting one source from the plurality of sources to have access to the resource responsive to the indicator for each of the sources, an order of selection of each of the sources, a type of data forwarded by each one of the plurality of sources, and independent of a size of data stored by each of the sources, wherein data associated with the one source comprises a plurality of data items, the apparatus further comprising:

a storage device to store, for each of the sources, a weight indicating an allotment of the resource to each of the sources;

a device, coupled to the storage device, for allocating transmit cycles to the one source by:

a), adding the weight associated with the one source to a balance;

b) forwarding a data item from the one source to the shared resource until-all data items of the data have been forwarded;

c) for each data item that is forwarded from the one source to the shared resource, decrementing the balance;

d) responsive to the balance being greater than zero, and the indicator indicating the presence of data at the source, repeating steps b and c until the balance is less than or equal to zero.

7. The apparatus as recited in claim 6, wherein the selection mechanism operates to select the one source independent of a size of data stored by each of the sources.

8. A network device for coupling a plurality of sources to an output port, comprising:

a plurality of allocations, each allocation associated with one of the plurality of sources, for indicating an allocation of the network device to the associated source;

a plurality of indicators, each indicator associated with one of the plurality of sources, for indicating whether the associated source has packet data to forward to the output port; and a selection mechanism for selecting one of the plurality of sources to forward packet data to the output port in response to an order of examining the indicators, a value of each of the indicators, a type of data forwarded from each one of the plurality of sources, the plurality of allocations, wherein the selection mechanism further comprises:

a storage device to store, for each of the sources, a weight indicating a desired bandwidth allocation for that source to the output port;

a device, coupled to the storage device, for allocating transmit cycles to the one source by:
a) adding the weight associated with the one source to a balance;
b) forwarding a data item from the one source to the shared resource until all data items of the data have been forwarded;
c) for each data item that is forwarded from the one source to the shared resource, decrementing the balance;
d) responsive to the balance being greater than zero, and the indicator indicating the presence of data at the source, repeating steps b and c until the balance is less than or equal to zero.

9. The network device of claim 8, wherein the selection mechanism operates to select the one of the plurality of sources independent of a size of the packet data stored at each of the sources.

* * * * *